United States Patent [19]

Zulliger

[11] 4,451,817
[45] May 29, 1984

[54] DYNAMOMETER TRANSDUCER UTILIZING AN AMORPHOUS METAL

[75] Inventor: Hans-Rudolf Zulliger, Uetikon, Switzerland

[73] Assignee: Mettler Instrumente AG, Greifensee-Zurich, Switzerland

[21] Appl. No.: 424,056

[22] Filed: Sep. 27, 1982

[30] Foreign Application Priority Data

Mar. 25, 1982 [CH] Switzerland ............... 1830/82

[51] Int. Cl.³ .......................................... H01L 10/10
[52] U.S. Cl. .................................. 338/47; 73/862.68; 177/211
[58] Field of Search ............... 338/2, 47, 6; 73/862.68, 774; 177/211

[56] References Cited

U.S. PATENT DOCUMENTS 2,556,132 6/1951 Ball ................................. 73/774 X
3,229,512 1/1966 Goudswaard et al. ............ 73/776
3,492,513 1/1970 Hollander, Jr. et al. .......... 338/47 X
4,298,382 11/1981 Stempin et al. .................. 75/202

FOREIGN PATENT DOCUMENTS 2349281 3/1975 Fed. Rep. of Germany .

OTHER PUBLICATIONS

*IEEE Transactions on Magnetics*, "Sensitive Force Transducers Using a Single Amorphous Core Multivibrator Bridge," vol. Mag-15, No. 6, Nov. 1979, pp. 1806-1808.
*IEEE Transactions On Magnetics*, "New Force Transducers Using Amorphous Ribbon Cores," vol. Mag-No. 5, pp. 1071-1075, Sep. 1978.

*Primary Examiner*—C. L. Albritton
*Attorney, Agent, or Firm*—Marianne Rich

[57] ABSTRACT

The transducing apparatus for a dynamometer includes a band shaped measuring element which is subjected to a load-dependent tensile force. The measuring element is made of an amorphous metal. It is band-shaped and may have one or two necked-down portions whose resistance varies as a function of applied force. Such measuring element has particularly desirable mechanical characteristics such as high limits of permissible applied force, resistance to creep, low hysteresis, and stability with respect to temperature variations.

6 Claims, 4 Drawing Figures

DYNAMOMETER TRANSDUCER UTILIZING AN AMORPHOUS METAL

Cross reference to related applications and publications: U.S. application Ser. No. 423,615 for: "Improved Transducer for a Dynamometer"; Inventor: Zulliger, filed simultaneously herewith, by the same inventor, and assigned to the same assignee. German Published Application No. 23 49 281; U.S. Pat. No. 4,298,382. All of the above applications and publications are hereby incorporated by reference into the present application.

The present invention relates to a transducer for dynamometer and, more particularly, to strain gauges used in electrical scales to furnish a load-dependent electrical signal.

BACKGROUND AND PRIOR ART

A transducer of this type is, for example, described in German Published Application No. 23 49 281.

This type of transducer is limited in some of its mechanical characteristics, for example, in the load which may be applied thereto. It is also excessively sensitive to variations in temperature, insofar as its use in electrical scales is concerned.

SUMMARY OF THE INVENTION

It is an object of the present invention to furnish a transducer having improved mechanical characteristics, as well as a decreased sensitivity to temperature variations. In spite of this, its construction and manufacture are to be simple and inexpensive.

SUMMARY OF THE INVENTION

In accordance with the present invention, the band-shaped measuring element is made of an amorphous metal. The amorphous metal, which is also known as metallic glass, may, for example, have the composition of $Ni_xSi_yB_z$, $Ni_aSi_bB_cFe_d$ or $Fe_xCr_yB_z$. Such alloys permit application of a tensile load of almost 40 kg/mm$^2$ without exceeding the elastic limit. The temperature coefficient of the modulus of elasticity and of the electrical resistance may be reduced almost to zero by suitable known additives such as Si, B, and Cr.

Such a reduction is particularly important for practical applications. Further, the resistance to creep as well as the small hysteresis associated with amorphous metals are particularly advantageous.

Preferably, the transducer has a necked-down portion. The load-dependent resistance change of the necked-down portion creates the measuring signal. Such an embodiment has the particular advantage that the zone of the transducer used for measuring is unambiguously defined and substantially free of any edge effects which might otherwise result from, for example, the way the transducer is held in place.

In an alternate preferred embodiment, a mechanical pre-stressing force is applied to the measuring element, the element having two necked-down sections whose load-dependent resistance changes are to be measured. In this embodiment, the force to be measured is applied between the two necked-down portions. This embodiment is particularly stable with respect to temperature variations, has a good linearity and, when suitably dimensioned, furnishes an increased output signal.

The novel features which are considered as characteristic of the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENT

Figure 1:
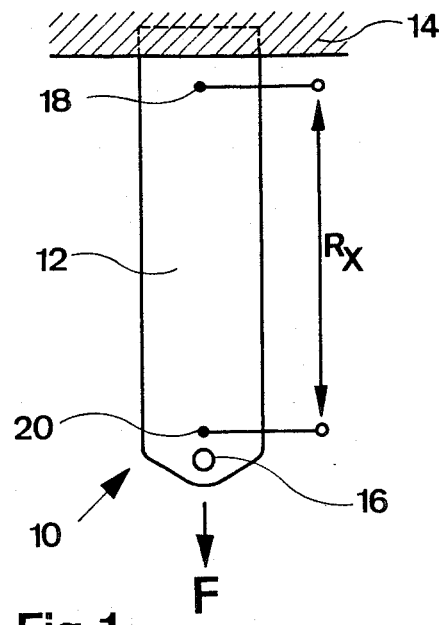
FIG. 1 is a schematic diagram, not to scale, of a first embodiment of the present invention.

The measuring element or transducer 10 shown in FIG. 1 consists of a narrow band 12 made of metallic glass. It is clamped into frame 14 at one end. Its free end has a bore 16 adapted to receive the element applying force F. Electrical connections may be made at two solder or welding points 18, 20 situated between the clamped end of the band and bore 16.

Figure 2:
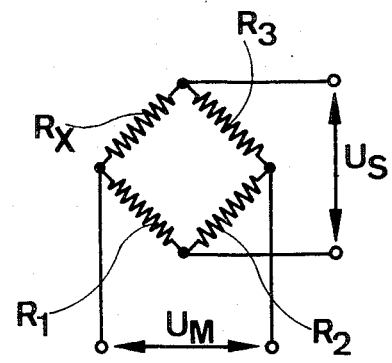
FIG. 2 is the bridge circuit corresponding to FIG. 2.

The actual transducer is formed by the region between soldered contacts 18 and 20. When force F is applied, band 12 is stretched and the electrical resistance $R_x$ changes. This change in resistance is detected in conventional fashion by means of a bridge circuit, e.g. that shown in FIG. 2. There, the supply voltage $U_S$ is applied to a bridge which is balanced when F=0. The bridge has fixed precision resistors $R_1$, $R_2$ and $R_3$. When force F is applied, the bridge is unbalanced and generates the measuring signal $U_M$. Resistors $R_1$ and $R_x$ on the one hand and $R_2$ and $R_3$ on the other hand should be matched in pairs, such matching including the temperature coefficient of resistance.

Typically, the dimensions of band 12 are as follows: Effective length 100 mm; width 2 mm; thickness 0.05 mm.

For a tensile strength of approximately 400 kg/mm$^2$, and the cross-sectional area of 0.1 mm$^2$, a maximum applied force of 40 kg results. About 4 kg may be reliably measured within the elastic region. When the total resistance of the effective length of the band is 1.3 ohm, an elongation of 2 per thousand results in a resistance change of 2.6 mohm. Suitable conventional measuring methods, for example with alternating current, allow this resistance change to be resolved into steps of 2.6 micro-ohms, corresponding to a resolution of 1,000:1.

Of course the place where band 12 is held in frame 14, and the element applying the force F must be electrically insulated by suitable materials (not shown in the drawing).

The materials for band 12 can be manufactured in a known fashion; for example, as described in U.S. Pat. No. 4,298,382.

The shape of the transducer shown in FIG. 1 may be refined further by letting the operative portion of band 12, namely the portion between contacts 18 and 20, be narrower than the two ends. This would make it similar to one-half of the second embodiment, namely the embodiment which will be described below with reference to FIG. 3. The desired shape may, for example, be punched out of the raw material.

Figure 3:
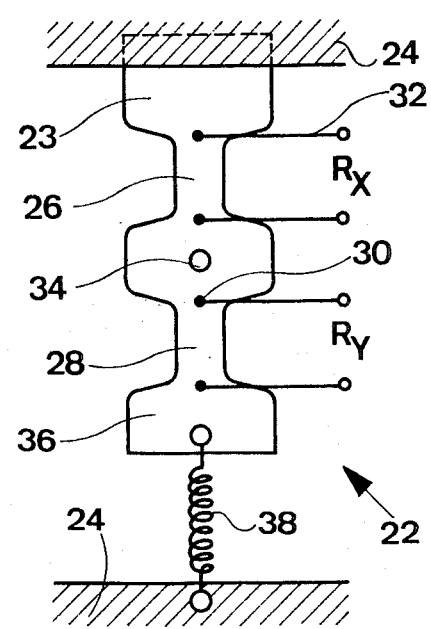
FIG. 3 is a schematic diagram, not to scale, of a second embodiment of the present invention.

A second preferred embodiment is illustrated in FIG. 3. Measuring element 22 again consists of a band having a length of 100 mm and a thickness of 0.05 mm. Its upper end 23 is fixedly clamped into frame 24 and elctrically isolated therefrom. The band has two necked-down portions 26 and 28 each having a width of 2 mm. The two necked-down portions define the effective lengths of resistors $R_x$, $R_y$. Electrical contacts 30 for lines 32 are spot welded onto the band.

A bore 34 is provided mid-day between the two necked-down portions 26 and 28. Bore 34 receives the force transmitting element. As it was in FIG. 1., the force F is applied in a downward direction, here between the two resistance portions $R_x$ and $R_y$. The lower end 36 of measuring element 22 is connected to frame 24 by means of a pre-stressing spring 38. When the spring constant of the measuring element and of spring 38 are matched to each other as well as to the pre-stressing force, this embodiment yields not only an improved linearity, but also an increase in the output signal. This is due to the fact that resistance portions $R_x$ and $R_y$ change in the opposite sense. Further, since temperature variations have the same effect on both resistance portions, automatic temperature compensation results.

Figure 4:
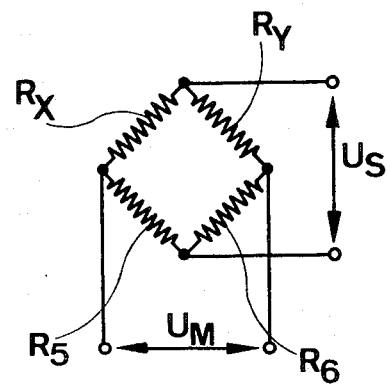
FIG. 4 is the schematic diagram of a bridge circuit corresponding to FIG. 3.

The circuit of FIG. 4 shows one possible arrangement of resistance portions $R_x$ and $R_y$ and of fixed resistors $R_5$ and $R_6$.

It should further be noted that the transducer according to the present invention acts not only as a strain gauge, but also as a spring. It generates not only the measuring signal, but also the reset force. This desirable combination of both favorable spring and resistance characteristics is made possible by the use of an amorphous metal. Conventional resistance materials have less favorable spring characteristics.

The pre-stressing force in the second embodiment could of course be generated by an applied mass, rather than the spring.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. In transducing apparatus having a member having a load-dependent deformation, and means for generating an electrical signal in response to said deformation, the improvement comprising a band-shaped measuring element made of amorphous metal constituting said member, said band-shaped measuring element having a length varying as a function of load applied thereto, said change in length constituting said load dependent deformation.

2. Transducing apparatus as set forth in claim 1, wherein said band-shaped element has at least one necked-down portion, said necked-down portion having a resistance varying as a function of applied load.

3. Transducing apparatus as set forth in claim 1, wherein said measuring element has a first and second necked-down portion; and wherein said load is applied between said first and second necked-down portion.

4. Transducing apparatus as set forth in claim 1, wherein said transducing apparatus further requires a reset member; and wherein said measuring elements made of amorphous metal further constitutes a said reset member.

5. Transducing apparatus as set forth in claim 1, wherein said load dependent deformation causes a change in an electrical characteristic of said member; and wherein said electrical signal generating means is responsive to said changes in said electrical characteristic.

6. Transducing apparatus as set forth in claim 1, wherein said electrical characteristic is the resistance of said measuring element.

* * * * *